United States Patent [19]

Paul et al.

[11] Patent Number: 5,506,298
[45] Date of Patent: Apr. 9, 1996

[54] POLYAMIDE GRAFT-MODIFIED RUBBERY BLOCK COPOLYMER COMPOSITIONS

[75] Inventors: Charles W. Paul, Madison; Jules E. Schoenberg, Bridgewater, both of N.J.

[73] Assignee: National Starch and Chemical Investment Holding Corporation, Wilmington, Del.

[21] Appl. No.: 226,613

[22] Filed: Apr. 12, 1994

[51] Int. Cl.$^6$ .............................. C08L 77/06; C08L 77/08
[52] U.S. Cl. ................................................. 525/66; 525/63
[58] Field of Search .................................................. 525/66

[56] References Cited

U.S. PATENT DOCUMENTS

| | | | |
|---|---|---|---|
| 4,225,476 | 9/1980 | Hammer et al. | 260/27 R |
| 4,419,494 | 12/1983 | Puletti et al. | 525/95 |
| 4,427,828 | 1/1984 | Hergenrother et al. | 525/66 |
| 4,713,415 | 12/1987 | Lavengood et al. | 525/66 |
| 4,777,211 | 10/1988 | Lavengood et al. | 525/66 |
| 4,871,799 | 10/1989 | Kobayashi et al. | 525/64 |
| 4,987,185 | 1/1991 | Aoki et al. | 525/66 |

FOREIGN PATENT DOCUMENTS

| | | |
|---|---|---|
| 0088932 | 9/1983 | European Pat. Off. . |
| 0260799 | 3/1988 | European Pat. Off. . |
| 0281005 | 9/1988 | European Pat. Off. . |
| 0527706 | 2/1993 | European Pat. Off. . |
| 60-079059 | 5/1985 | Japan . |
| 5247426 | 9/1993 | Japan . |
| 2053238 | 2/1981 | United Kingdom . |

OTHER PUBLICATIONS

A. Y. Coran and R. Patel, Rubber Chem. Tech., vol. 56, No. 5, pp. 1045–1060 (1983).
Kraton® FG 1901X Rubber, Shell Technical Bulletin, SC: 592–87.
S. H. Dillman and A. Sanders, *Maleated SEBS Copolymers Enhance Polar Compatibilty*, Adhesives Age, Nov. 1989, pp. 24–29.

*Primary Examiner*—Ana L. Carrillo
*Attorney, Agent, or Firm*—Jane E. Gennaro

[57] ABSTRACT

Polyamide graft-modified rubbery block copolymer compositions are provided by reaction of maleated rubbery block copolymers with polymeric dimer fatty acid based polyamide wherein the molar ratio of maleated rubbery block copolymer to the dimer fatty acid polyamide is greater than 2 to 1. The compositions find use as hot melt adhesive components.

4 Claims, No Drawings

POLYAMIDE GRAFT-MODIFIED RUBBERY BLOCK COPOLYMER COMPOSITIONS

BACKGROUND OF THE INVENTION

This invention relates to modified thermoplastic compositions. More specifically, the invention relates to maleated rubbery block copolymers which are modified by reaction with polymeric, dimer fatty acid based polyamide to provide maleated rubbery block copolymers with polymeric polyamide grafted thereon. The novel compositions find use as hot melt adhesive components.

In a further embodiment, the invention provides a means of improving some property characteristics or deficiencies in polyamide based adhesives and deficiencies of adhesives based on rubbery block copolymers. As a class, polyamide based hot melt adhesives are known to possess a high degree of heat resistance (high melting point) and very good solvent resistance. However, it is also known that polyamide hot melt adhesives are generally brittle, exhibiting poor tensile elongation properties, particularly at low temperatures. Polyamide adhesives also display poor adhesion to non-polar surfaces. When employed in polyamide hot melt adhesives, the compositions of the present invention will provide marked improvements in the noted properties of the adhesives herein as compared to prior art polyamide based hot melts. The rubbery copolymer component of the present adhesives tends to flexiblize and toughen the brittle polyamide component at ambient temperatures and at temperatures below room temperature.

In a recent attempt to improve heat and plasticizer resistant properties of hot melt adhesives based on rubbery copolymer, U.S. Pat. No. 4,419,494 to P. Puletti, et al. teaches rubbery block copolymer adhesive formulations incorporating 20–70% of a tackifying resin and 1–20% of a polymeric fatty acid polyamide.

SUMMARY OF THE INVENTION

In its broad aspect this invention is directed to novel thermoplastic compositions comprising 50 to 95% by weight of a maleated rubbery block copolymer having the general configuration A-B-A wherein A is a non-elastomeric polymer block derived from the moieties of a monovinyl aromatic hydrocarbon monomer, and B is an elastomeric polymer block derived from the moieties of a conjugated diene monomer or hydrogenated derivatives thereof, having 1 to 30%, preferably 5 to 15%, by weight of a polymeric dimer fatty acid polyamide grafted thereto. Within the above proportions, it is necessary that the molar ratio of maleated rubbery block copolymer to the dimer fatty acid polyamide be greater than 2 to 1. Additionally, in preferred compositions any anhydride functionalities available on the block copolymer after reaction with the polyamide are reacted with an aliphatic monoamine.

In a further, more narrow aspect, the present invention is directed to improved polyamide hot melt adhesives comprising the described polyamide graft-modified rubbery block copolymer. The practitioner will recognize that the generally described polyamide graft-modified rubbery block copolymer compositions will include a wide variety of specific compositions suitable for use in preparing hot melt adhesive formulations to yield a desired balance of properties.

In a still further aspect, the present invention is directed to a method for improving the tensile elongation properties (reducing the brittleness) of polyamide hot melt adhesives by adding thereto the polyamide graft-modified rubbery block copolymer or a polyamide graft-modified rubbery block copolymer/diluent blend such that the copolymer constitutes 1 to 40% or the copolymer/diluent blend constitutes 1 to 60% of the total adhesive.

DETAILED DESCRIPTION OF THE PREFERRED EMBODIMENT

The rubbery (elastomeric) component of the compositions of the present invention are block copolymers having the general configuration:

A-B-A wherein the polymer blocks A are non-elastomeric polymer blocks which, as homopolymers have glass transition temperatures above 20° C., while the center elastomeric polymer blocks are derived from at least one conjugated diene such as butadiene or isoprene. These mid-blocks may, if desired, be partially or substantially hydrogenated. Further, they may be linear or branched. Typical branched structures contain a mid-block portion with at least three branches which can radiate out from a central hub or can be otherwise coupled together.

While the specific molecular weight of the block copolymer prepared from the conjugated diene and the non-elastomeric terminal blocks may be varied for specific end uses, it is preferred that the elastomeric center blocks have an average molecular weight from about 15,000 to about 250,000, preferably 24,000–150,000, and that they comprise from 50 to 90% by weight of the entire block copolymer. The terminal blocks which comprise the remaining 10 to 50% of the copolymer are those having average molecular weights between 5,000 and 125,000, preferably 5,000–25,000. The molecular weights mentioned herein are number average molecular weight. These terminal blocks are prepared by polymerization of vinyl aromatic monomers and should have glass transition temperature above about 50° C., and the difference in glass transition temperature between that of the center block and of the end blocks should be greater than about 100° C.

The non-elastomeric terminal blocks preferably comprise homopolymers or copolymers of mono vinyl aromatic monomers such as styrene, vinyl toluene, vinyl xylene, ethyl vinyl benzene as well as bicyclic monovinyl compounds such as vinyl naphthalene and the like.

The center elastomeric blocks are prepared from conjugated dienes such as isoprene, butadiene, copolymers of styrene and butadiene as well as their homologues. Additionally, these elastomeric blocks may be hydrogenated as taught, for example, in U.S. Pat. No. 3,700,633.

The non-functionalized block copolymers may be prepared using methods taught, for example, in U.S. Pat. Nos. 3,239,478; 3,427,269; 3,700,633; 3,753,936 and 3,932,327 or they may be obtained from manufacturers such as Shell Chemical Company or Dow Chemical as well as Fina Ltd. in the Netherlands.

For use in the present invention it is necessary that the described A-B-A copolymers be reacted with maleic anhydride to provide the copolymer with anhydride functionality. Procedures for this reaction are known to those skilled in the art. See, for example, U.S. Pat. No. 4,506,056 to Norman G. Gaylord, U.S. Pat. No. 4,578,429 to William P. Gergen, et al. and U.S. Pat. No. 4,762,890 to Chad A. Strait, et al. The level of maleic anhydride functionality will ordinarily range from about 1 to 4% by weight of copolymer.

The preferred maleated rubbery block copolymer employed herein consists of polystyrene end blocks and poly(ethylene/butylene) midblocks which is available commercially from Shell Chemical Company as Kraton® FG 1901X Rubber. The styrene content is 28% by weight and the level of anhydride functionality is about 2% by weight.

The polymeric dimer fatty acid polyamide resins are generally prepared by reaction under conventional amidification conditions of a polymeric fatty acid or mixtures thereof with other dicarboxylic acids (such as azeleic acid or adipic acid) with a diamine (such as ethylenediamine or piperazine) or mixtures thereof. Preferred polyamides as used herein are prepared from multiacids and multiamines in which at least 40 mole percent of the multiacid is derived from unsaturated fatty acids, typically $C_{18}$ acids such as oleic, linoleic and linolenic acid. Because of their ready availability and relative ease of polymerization, oleic and linoleic acids are the preferred starting materials for the preparation of the polymeric fatty acid resins used herein. Mixtures of these two acids are found in tall oil fatty acids and, accordingly, commercial tall oil fatty acids are a common source for preparing the described polymeric fatty acid resins. These multiacids are prepared by self condensation of unsaturated fatty acids to produce "dimer" acids but the dimerization process typically produces up to about 25% of triacid as well. For purposes of this invention the term dimer acid is meant to include small amounts of trimer acid. The preparation of these dimer acids is further described in *Encyclopedia of Chemical Technology*, "Dimer Acids", E. Leonard, 3 ed., vol. 7, p. 768, Wiley (1979).

The stoichiometry of the polymerization of the multiacids and multiamines is controlled to yield predominately (e.g., >75%) amine end groups. Polyamides of this type are described in the above-noted reference and also in the *Handbook of Adhesives* "Polyester and Polyamide High Performance Hot Melt Adhesives", C. Rossitto, 3 ed., p. 478, I. Skeist editor, Van Nostrand-Reinhold (1990). Typical of the dimer fatty acid polyamides of this type are the Uni-Rez® polyamides (various grades) sold by Union Camp Corporation. Suitable other polymeric fatty acid polyamides may be obtained from General Mills (Henkel) under the tradenames "Versamid", and "Macromelt".

The aliphatic monoamines employed to react with the anhydride functionalities which remain after the reaction of the block copolymer with the polyamide can be of any type provided they are compatible with the system. Low volatility is also desirable as the reaction with residual anhydride is typically carried out in an open vessel. Aliphatic amines having carbon chain lengths above 11 carbon atoms are preferred. Primary amines are preferred for their reactivity and particularly preferred is hydrogenated tallow alkyl amine, a $C_{18}$ primary amine.

Antioxidant(s) are added to provide temperature stability to the composition. Among the applicable antioxidants (stabilizers) utilized herein are included high molecular weight hindered phenols and multifunctional phenols such as sulfur and phosphorus-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy groups. Representative hindered phenols useful herein include:

1,3,5-trimethyl-2,4,6-tris (3,5-di-tert-butyl-4-hydroxybenzyl)benzene;

pentaerythrityl tetrakis-3(3,5-di-tert-butyl-4-hydroxyphenyl)propionate;

n-octadecyl-3(3,5-di-tert-butyl-4-hydroxyphenyl)-propionate;

4,4'-methylenebis (2,6-di-tert-butylphenol);

2,2'-methylenebis (4-methyl-6-tert-butylphenol);

4,4'-thiobis (6-tert-butyl-o-cresol);

2,6-di-tert-butylphenol;

6-(4-hydroxyphenoxy)-2,4-bis(n-octylthio)-1,3,5-triazine;

2,4,6-tris-(4-hydroxy-3,5-di-tert-butylphenoxy)-1,3,5-triazine;

di-n-octadecyl 3,5-di-tert-butyl-4-hydroxy-benzyl-phosphonate;

2-(n-octylthio)ethyl 3,5-di-tert-butyl-4-hydroxybenzoate; and sorbitol hexa-[3-(3,5-di-tert-butyl-4-hydroxy-phenyl)-propionate].

The antioxidants are used herein in conventional amounts, for example, from about 0.1 to 1.5% of the total composition. As a precaution, antioxidants containing ester groups should not be added to the mixture prior to reaction of the polyamide and the aliphatic monoamine with the anhydride groups on the maleated rubbers.

As is known, the performance of these antioxidants may be further enhanced by utilizing, in conjunction therewith; (1) synergists such, for example, as thiodipropionate esters and phosphites; and (2) chelating agents and metal deactivators such, for example, as ethylenediamine tetraacetic acid, salts thereof, and disalicylalpropylenediimine.

The preferred compositions of the invention, polyamide graft-modified rubbery block copolymers, are prepared employing maleated rubbery block copolymer (having a maleic anhydride functionality of about 1–4% by weight of the copolymer) reacted with 5–15% by weight of polymeric dimer fatty acid polyamide resin. Any anhydride functionality remaining on the maleated block copolymer is removed by further reaction with a compatible aliphatic monoamine. Ordinarily, the amount of aliphatic monoamine employed will be a slight excess over the calculated stoichiometric amount needed to remove the remaining anhydride functionality. In most instances, the amount of aliphatic monoamine needed for further reaction with the maleated block copolymer will range from about 1 to 8% by weight of the maleated copolymer but this range may be extended depending on the molecular weight of the monoamine and the amount of anhydride functionality remaining on the maleated rubbery copolymer after reaction with the polyamide resin. Stoichiometry is controlled to provide an end-composition essentially devoid of anhydride functionality.

Diluents may be used in preparing the compositions depending on their end-use or in order to reduce the melt viscosity and provide improved mixing conditions. Among suitable diluents are included (1) mineral oil, (2) polybutene, (3) rosin esters of pentaerythritol, (4) polymeric dimer fatty acid polyamide resin (acid-terminated >75%), (5) terpene phenolic resins, and (6) animal or vegetable waxes. Ordinarily, the amount of diluent, when used, will not exceed about 60% by weight of the final copolymer/diluent blend.

The actual preparation of the compositions of the invention does not require any unusual considerations. Essentially, the procedure involves melting the maleated rubbery block copolymer and the addition thereto of the polymeric dimer fatty acid polyamide with suitable mixing. Antioxidant is ordinarily added to the melt prior to the addition of the fatty acid polyamide. If desired, a calculated amount of alkyl amine is added to react with any remaining anhydride functionality.

Structurally, the compositions of the invention can be described as comprising molecules composed of long chain maleated rubbery block copolymer chains where certain defined polyamides are attached to the block copolymer at the anhydride sites and serve as cross-chains. In preferred compositions, any anhydride functionalities on the block copolymer remaining after such reaction with the polyamide resin are further reacted with an aliphatic amine or mixtures thereof.

In a further aspect of the invention, the described polyamide graft-modified block copolymers or polyamide graft-modified block copolymer/diluent blends are used to formulate polyamide hot melt adhesive with the resultant formulated adhesive exhibiting improvement in several important properties. The formulated adhesives are prepared employing the same polymeric dimer fatty acid polyamides which are used in preparing the polyamide graft copolymer and described above although the dimer fatty acid polyamide may be amine terminated or acid terminated (>75% acid terminated). With respect to amounts, it has been found that useful improvements are realized when the final polyamide adhesive contains from 1 to 40% of the polyamide graft-modified block copolymer or 1 to 60% of the polyamide graft-modified block copolymer/diluent blend.

It will be recognized by the practitioner that additives conventionally used in hot melt adhesives may be utilized herein to modify specific properties. For example, tackifying resins in amounts up to about 50% by weight of the total adhesive may be included. The term tackifying resin includes (1) natural and modified rosins such, for example, as gum rosin, wood rosin, tall-oil rosin, distilled rosin, hydrogenated rosin, dimerized rosin, and polymerized rosin; (2) glycerol and pentaerythritol esters of natural and modified rosins, such, for example, as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) polyterpene resins having a softening point, as determined by ASTM method E28-58T, of from about 80° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (4) chlorinated terphenyl resins containing from about 42 to 60% by weight, of chlorine; (5) phenolic-modified terpene resins such, for example, as the resin product resulting from the condensation, in an acidic medium, of a monoterpene, and a phenol; (6) aliphatic petroleum hydrocarbon resins having a Ball and Ring softening point of from about 70° to 135° C.; the latter resins resulting from the polymerization of monomers consisting of primarily of olefins and diolefins; also included are the hydrogenated aliphatic petroleum hydrocarbon resins; (7) aromatic petroleum hydrocarbon resins and the hydrogenated derivatives thereof; and (8) alicyclic petroleum hydrocarbon resins and the hydrogenated derivatives thereof. Mixtures of two or more of the above described tackifying resins may be used for some formulations.

Other additives in the hot melt adhesives may include antioxidant(s) such as described above, colorants such as titanium dioxide, wax and oils, and fillers such as clay and talc, etc. Additionally, other polymers known and used in A-B-A rubbery block copolymer type hot melt adhesives may also be present (in amounts preferably less than 20% by weight) in the adhesives described herein.

The procedure for preparing these hot melt adhesives typically involves placing the graft copolymer or graft copolymer/diluent blend and antioxidant, if used, in a mixing kettle, preferably in a jacketed heavy duty mixer of the Baker-Perkins or Day type, which is equipped with rotors and thereupon raising the temperature to a range of from about 250° to 350° F., the precise temperature utilized depending on the melting point of the resins employed. After the initial melting and mixing, the dimer fatty acid polyamide, tackifying resin(s), if any is desired, are added and mixing continued. Toward the end of the mixing cycle, any oil or wax or other optional component which is to be used is added and the melting and mixing continued until a smooth homogeneous mass is obtained. In some cases it may be advantageous to react the amine ends of the polyamide with a mono-epoxide to ensure it does not crosslink the graft copolymer.

The resulting hot melt adhesive is drawn off and may be used immediately in hot pots; or, it may be extruded into rope form or converted into pellets, rods, cylinders, slugs or billets depending on the equipment which will be subsequently used to apply the hot melt during application thereof; or, it may be placed in cooling pans and held in bulk form for later use; or, it may be granulated or diced.

In use, the hot melt adhesive is applied in a molten state to one or both surfaces to bonded together. The surfaces are then brought together with the interposed molten adhesive and the adhesive allowed to cool and solidify. Application of the adhesive may be carried out employing conventional hot-melt adhesive applicators as are known in the industry.

In the following examples, viscosity was measured on molten samples at 350° F, employing a Brookfield viscometer with a No. 27 spindle.

Tensile Measurements: These measurements were made on adhesive film strips (20 mils thick, ⅛ in. by 3 in.) using an Instron 4507 Tensile Tester with pneumatic grips under the following conditions:
 Cross-Head Speed: 5 inches/minute
 Gage Length: 0.5 inches
 Testing Temperature: Room Temperature
 Cold Crack: Films of the adhesive (20 mils thick) were cut into ½ in. by 2 in. strips. The film strips were held in a freezer at the test temperature for 10 minutes prior to testing. The test consisted of rapidly bending the film around a 1/16 in. thick aluminum plate using a slotted wooden block. (Both the block and plate are also at the test temperature.) The temperature was lowered until the film cracked during bending and the temperature was noted. A fresh piece of film was used for each test.
 Stability:
 Samples were aged in a forced air oven at 350° F. using a glass jar (4 oz.) covered with aluminum foil and about half full of the test adhesive.

EXAMPLE 1

A Brabender Prep mixer with Banbury-style mixing blades was heated to 170° C. (338° F.) and charged with 218 g of maleated rubbery block copolymer (polystyrene end blocks with poly (ethylene/butylene) midblocks), approx. mw=49,000 (4.45 mmole) 28% by weight styrene, 1.6% by weight maleic anhydride, 35.2 mmole of anhydride, obtained from Shell as Kraton® FG 1901X Rubber. Mixing was continued for 20 to 25 minutes to provide a homogeneous viscous melt. An antioxidant, 2.5 g of Irganox® 1098 (Ciba-Geigy) was blended into the melt over a period of 10 minutes after which 27.3 g of polymeric polyamide (Uni-Rez® 2648), approx. mw= 15,000 (1.8 mmole) 3.55 mmole of amine ends was added. This polyamide contains mostly amine ends and was characterized to have an amine number of 7.3 (1.30×10$^{-4}$ moles of amine per gram of polyamide) determined by titration procedures provided by the manufacturer. Upon addition of the polyamide, the torque on the mixing blades increased dramatically from 6,000 m-g to 9,000 m-g. Mixing of the reactants was continued for 20 minutes after which 8.6 g (32.9 mmole) of hydrogenated tallow alkyl amine ((Armeen HT) was slowly added to the mixer to react with the remaining unreacted anhydride groups on the maleated block copolymer. The grafting of these side chains lowered the torque on the mixing blades to abut 5,500 m-g (meter-grams). The product was a rubbery, plastic solid. IR analysis on a thin film of the product showed almost complete disappearance of the anhydride peaks at 1787 cm$^{-1}$ and 1865 cm$^{-1}$ and appearance of a very strong acid peak at 1709 cm$^{-1}$, indicating an essentially complete reaction of the anhydride.

EXAMPLE 2

Materials and procedures used here were generally as described in Example 1 except that 2.7 g of antioxidant and 77 g of mineral oil were added to the mixer prior to adding the polymeric polyamide, with the mineral oil serving as diluent to lower the viscosity of 166 g of Kraton® FG 1901X Rubber. The torque on the mixing blades at this point was 800 m-g. Addition of 20.9 g of Uni-Rez® 2648 increased the torque to 2700 m-g. Subsequent addition of 6.5 g of Armeen® HT lowered the torque to 1200 m-g. Again, the product was a rubbery, plastic solid. IR analysis on a thin film of the product showed a nearly complete disappearance of the anhydride groups.

EXAMPLES 3-10

Additional examples were run using procedures as described in Examples 1 and 2 and materials and amounts in grams as given in Table I.

EXAMPLES 11 AND 12

Materials and procedures used were as described in Example 1 using 90.4 g of the maleated block copolymer, 11.3 g of polyamide and 2.7 g of antioxidant in both examples. In Example 11, the diluent employed was the acid terminated Uni-Rez 2620 (162 g) while in Example 12, the diluent was the acid terminated Uni-Rez 2641 (162 g). The product of Example 11 was grainy and not homogeneous. The temperature during the addition of the diluent in Example 12 was 170° C. The melt product of Example 12 was smooth and homogeneous. The cooled product was slightly hazy, tough and rubbery.

EXAMPLE 13

This example illustrates the preparation of a hot melt adhesive using the polyamide graft copolymer/diluent blend prepared as described in Example 12.

A suitable Baker-Perkins mixing bowl with sigma-style blades was heated to 150° C. (302° F.) and 50.0 grams of the polyamide graft-modified copolymer/diluent blend of Example 12 was added to the heated bowl forming a homogeneous melt. A polyamide adhesive, Uni-Rez 2622 (50.0 grams) was slowly added forming a clear homogeneous blend. An epoxidized alpha olefin, Vikolox® 16 supplied by Atochem in an amount of 0.659 (2.7 mmole) was added by syringe to react with the free amino ends of Uni-Rez 2622 and prevent crosslinking. Mixing was continued for an additional 15 minutes after which the blend was removed for cooling and storage. The resulting solid blended adhesive product was clear, tough and rubbery.

EXAMPLE 14

A Brabender Prep mixer with Banbury-style blades was heated to 160° C. (320° F.) and charged with 35.5 g of the polyamide graft copolymer/diluent blend of Example 2 and the blend melted. Slowly, 268 g of Uni-Rez 2648, a polyamide adhesive (amine terminated) was added to the mixer to form a clear, homogeneous melt. On cooling, the blended adhesive product exhibited a tough, rubbery texture that was more flexible yet stronger and more extensible than the neat Uni-Rez 2648. The properties of this blended adhesive are summarized in Table 3.

TABLE I

| EXAMPLE | KRATON G 1901-X | POLYAMIDE | DILUENT | | ALKYAMINE* | T (°C.) | ANTIOXIDANT** |
|---|---|---|---|---|---|---|---|
| 3 | 147.0 | Uni-Rez 2636$^a$ 18.2 | Mineral oil | 69 | 5.8 | 170 | 2.4 |
| 4 | 147.0 | Uni-Rez 2622$^b$ 18.7 | Mineral oil | 69 | 5.8 | 160 | 2.4 |
| 5*** | 166.0 | Uni-Rez 2648 30.8 | A | 77 | None | 160 | 2.7 |
| 6 | 166.0 | Uni-Rez 2648 20.8 | B | 76 | 6.5 | 150 | 2.7 |
| 7 | 113.7 | Uni-Rez 2648 14.2 | C | 135 | 4.5 | 150 | 2.6 |
| 8 | 113.7 | Uni-Rez 2648 14.2 | B | 135 | 4.5 | 150 | 2.6 |
| 9 | 90.4 | Uni-Rez 2648 11.3 | D | 162 | 3.6 | 150 | 2.7 |
| 10 | 90.4 | Uni-Rez 2648 11.3 | E | 162 | 3.6 | 150 | 2.7 |

*alkylamine used was Armeen ® HT supplied by Armour
**antioxidant used was Irganox ® 1098, Ciba-Geigy
Diluent A = Ketjenflex 8, toluene sulfonamide, Akzo
Diluent B = H 300, polybutene, Amoco
Diluent C = H 100, polybutene, Amoco
Diluent D = Unitac R-100 Light, rosin ester of pentaerythritol, Union Camp Corp.
Diluent E = Nirez 300, terpene phenolic, Arizona Chemical
***Example 5 is illustrative only and contains no alkylamine and is not representative of the present invention. The mixing blade torque did not increase when the polyamide was added to the maleated copolymer indicating the toluene sulfonamide diluent may have inhibited the grafting reaction.
$^a$approx. mw = 15,000 and amine no. is 7.4.
$^b$approx. mw = 15,000 and amine no. is 7.2.

EXAMPLE 15

In this example a rubber/diluent control was prepared using a non-functionalized (unmaleated) styrene-ethylene/butylene-styrene block copolymer containing 28% by weight styrene.

A Brabender Prep mixer with Banbury style blades was heated to 160° C. (320° F.) and charged with 172 g of Kraton G 1652 and the block copolymer was melted with mixing. After a homogeneous melt was formed, 69 g of mineral oil and 2.4 g of Irganox 1098 was added to the melt. On cooling the final product was a rubbery, homogeneous solid.

EXAMPLE 16

The procedures described in Example 14 were repeated using the rubber/diluent blend control product of Example 15 in place of the polyamide graft copolymer/diluent. A hazy, non-homogeneous product was obtained with properties summarized in Table 3.

As noted in Table 3, the product had low tensile elongation, was highly viscous and formed a thick rubbery surface layer on standing at elevated temperatures. Table 2, below, summarizes the components of the hot melt adhesives of Examples 13, 14 and the control adhesive of Example 16.

TABLE 2

| EXAMPLE | POLYAMIDE* | WT. OF GRAFT COPOLYMER/ DILUENT BLEND |
|---|---|---|
| 13 | 50.0 g | 50.0 g (prep. in Ex. 12) |
| 14 | 268 g | 35.5 g (prep. in Ex. 2) |
| 16 | 247 g | 32.8 (control, Ex. 15) |

*In example 13, Uni-Rez 2622 was used.
In Example 14 and 16, Uni-Rez 2648 was used.

Table 3, below, summarizes selected properties of the adhesives of Examples 13 and 14, compared to unformulated dimer fatty acid based polyamide adhesives and the adhesive of Example 16, a control prepared with a non-grafted styrene-ethylene/butylene-styrene block copolymer. It is seen that the break strain of the polyamide-based adhesive increases as does cold crack resistance (lower cold crack temperature) upon addition of the grafted block copolymer/diluent of the invention. Addition of block copolymer/diluent without polyamide grafts (Ex. 16) to a polyamide-based adhesive reduces break strain and results in phase separation on standing at elevated temperature, both of which are undesirable.

EXAMPLE 17

This example illustrates two additional adhesive compositions of this invention (described in Table 4).

TABLE 4

| Adhesive | Polyamide* | % By Weight of Graft Copolymer/Diluent Blend |
|---|---|---|
| A | 50% | 50% (Prep. in Ex. 12) |
| B | 50% | 50% (Prep. in Ex. 12) |

*In Adhesive A, Uni-Rez 2665 was used.
In Adhesive B, Uni-Rez 2620 was used.

Table 5, below, summarizes selected properties of the adhesives compared to the neat polyamide. Addition of polyamide graft-modified block copolymer/diluent to these polyamide adhesives results in softer adhesives (lower modulus) with better cold resistance (lower cold crack temperature) and comparable or greater break strain.

TABLE 5

|  | Uni-Rez 2665 | Uni-Rez 2620 | Adhesive A | Adhesive B |
|---|---|---|---|---|
| Tensile |  |  |  |  |
| Stress @ 100% strain (psi) | 1360 ± 50 | — | 920 ± 30 | 740 ± 20 |
| Tensile modulus (ksi) | 24 ± 2 | 18 ± 3 | 13 ± 2 | 12 ± 2 |
| Break strain (%) | 1300 ± 200 | 60 ± 5 | 1470 ± 80 | 360 ± 183 |
| Cold Crack Temp. (°F.) | 60–70° F. | >70° F. | 0–10° F. | 20–30° F. |

The practitioner will recognize that the maleated A-B-A rubbery block copolymer used herein may be replaced with other maleated polymers, for example, maleated amorphous polyalphaolefin (APAO).

What is claimed is:

1. A polyamide graft-modified block copolymer composition comprising a maleated rubbery block copolymer having the configuration A-B-A wherein A is a non-elastomeric

TABLE 3

|  | Uni-Rez 2648 | Uni-Rez 2622 | Adhesive of Ex. 13 | Adhesive of Ex. 14 | Ex. 16 Control |
|---|---|---|---|---|---|
| Stability-after standing 24 hours @ 35° F. Separation | No | No | No | No | Yes |
| Viscosity Cp. 350° F. |  |  |  |  |  |
| Initial | 7,100 | 2,100 | 29,400 | 10,000 | 30,400 |
| After Standing 24 hours @ 35° F. | 6,300 | 3,400 | 36,500 | 8,400 | 5,940 |
| Tensile Strength |  |  |  |  |  |
| Stress @ 100% strain (psi) | 258 ± 10 | — | 863 ± 15 | 244 ± 11 | 462 ± 23 |
| Break strain (%) | 720 ± 79 | 77.8 ± 12 | 1094 ± 124 | 938 ± 69 | 250 ± 55 |
| Cold Crack Temp. (°F.) | <−40° | 60–70° | 10–20° | <−40° | — | polymer block derived from the moieties of a monovinyl aromatic hydrocarbon monomer and B is an elastomeric polymer block derived form the moieties of a conjugated diene monomer or a hydrogenated derivative thereof, said maleated rubbery block copolymer having 1–30% by weight of a polymeric dimer fatty acid polyamide, the polyamide having greater than 75% amine end groups, grafted thereto and the molar ratio of maleated rubbery block copolymer to the dimer fatty acid polyamide is greater than 2 to 1.

2. The polyamide graft-modified block copolymer composition of claim 1 wherein any anhydride functionalities remaining on the maleated rubbery block copolymer after reaction with the dimer fatty acid polyamide have been reacted with an aliphatic monoamine.

3. The polyamide graft-modified block copolymer composition of claim 1 wherein said maleated rubbery block copolymer has 5 to 15% by weight of a polymeric dimer fatty acid polyamide grafted thereto.

4. The polyamide graft-modified block copolymer of claim 1 wherein the maleated rubbery block copolymer is a maleated styrene-ethylene/butylene-styrene block copolymer.

* * * * *